Dec. 28, 1948. P. E. HAWKINSON 2,457,370
MOLD CONSTRUCTION
Filed Sept. 25, 1947
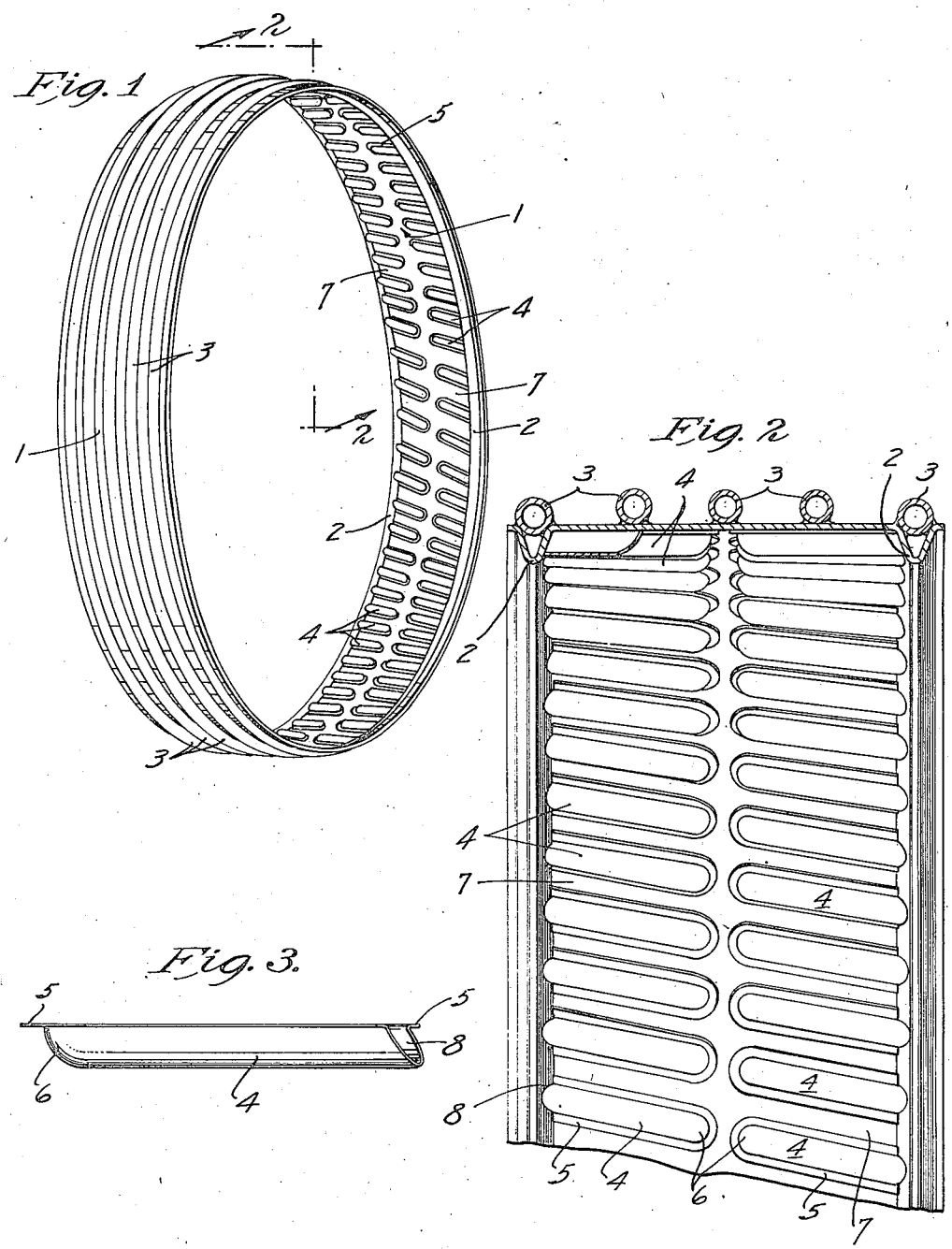
Inventor
Paul E. Hawkinson
By his Attorneys
Merchant & Merchant Patented Dec. 28, 1948

2,457,370

UNITED STATES PATENT OFFICE 2,457,370

MOLD CONSTRUCTION

Paul E. Hawkinson, Minneapolis, Minn., assignor to Paul E. Hawkinson Company, Minneapolis, Minn., a corporation of Minnesota Application September 25, 1947, Serial No. 775,991

1 Claim. (Cl. 18—18)

My invention relates to the construction of tire treading molds and more particularly to the construction of tire treading molds of the type broadly disclosed and claimed in my earlier Patent No. 1,917,262.

One of the objects of my invention is to provide a tire treading mold for molding traction treads of a directional type, that is, treads having open-ended generally transversely-extending grooves formed by circumferentially-spaced generally transversely-extended ribs.

Another object of my invention is a mold of the type immediately above-described, which is manufactured from sheet metal, which is rugged in construction, and inexpensive to manufacture.

The above and still further objects of my invention will become apparent from the following detailed specification, appended claims, and attached drawings.

Referring to the drawings, wherein like characters indicate like parts throughout the several views:

Fig. 1 is a view in perspective of a tire treading mold constructed according to my present invention;

Fig. 2 is an enlarged fragmentary section taken substantially on the line 2—2 of Fig. 1; and Fig. 3 is a view in side elevation of one of the mold elements of my improved tire treading mold.

Referring with greater particularity to the drawings, the numeral 1 indicates a generally cylindrical mold of the well-known Hawkinson type and which, in practice, is designed to replace the worn tread of pneumatic tires by the Hawkinson method described and broadly claimed in my earlier application No. Re. 21,956.

Mold 1 is preferably formed from sheet steel and is provided adjacent its edges with cross-sectionally V-shaped radially inwardly-extending continuous confining flanges 2. The numeral 3 indicates a heating element preferably in the form of a continuous spirally wound tubing adapted to conduct steam or other heating fluid.

A plurality of molding or tread pattern-forming elements 4, as shown, preferably are pressed from sheet metal so as to be U-shaped in cross-section. A flange 5 extends continuously around two opposite sides and a closed end 6. Molding elements 4 are secured to the inner face of the mold 1 intermediate the flanges 2 by means of screws or the like not shown, which project through the flange 5. Also, preferably and as shown, the molding elements 4 extend generally transversely of the mold in a slightly diagonal direction, in laterally-spaced circumferentially-extending rows. The circumferential space between the molding elements 4 (indicated by the numeral 7) may be varied at will, depending upon the desired width of the rib therebetween. Likewise, the lateral spacing of the rows of molding elements 4 may be varied. As above indicated, the inner ends of the molding elements 4 are closed, as indicated by the numeral 6. This closure 6 obviously imparts great strength to the inner end of the molding element 4, thus enabling it to withstand the great pressures to which it is subjected when an inflated tire of greater diameter than the mold 1 has been placed therein for the purpose of curing a new tread thereon.

However, as will be observed, the outer ends of the molding elements 4 are, prior to their being secured to the mold 1, open, as indicated at 8 (see Fig. 3) and are, therefore, not normally capable of withstanding pressures equal to those of which the closed end 6 is capable of withstanding. In order to impart sufficient strength to the open end 8, I shape it to conform precisely to the shape of the adjacent side of the confining flange 2 against which it is made to abut. I find that this beveling of the open end 8 of the elements 4, to conform to the bevel of the confining flange 2, imparts great strength to the rib or tread design forming element 4.

My invention has been thoroughly tested and found to be a completely satisfactory and inexpensive way of producing molds for directional treads having generally transversely-extending open-ended slots therein.

What I claim is:

A device of the class described comprising an unbroken cylinder-like mold having radially inwardly projecting cross-sectionally V-shaped confining flanges adjacent its edges, a plurality of elongated cross-sectionally U-shaped mold elements secured to said mold intermediate said flanges so as to provide a plurality of radially inwardly projecting generally transversely-extending parallel tread pattern-forming ribs, each of said mold elements being of less radial depth than said flanges, and each of said mold elements being formed with one closed end and having its opposite end abutting against and shaped to conform to the edge of one of said confining flanges.

PAUL E. HAWKINSON.

REFERENCES CITED

The following references are of record in the file of this patent:

UNITED STATES PATENTS

| Number | Name | Date |
| --- | --- | --- |
| 2,331,680 | Hawkinson | Oct. 12, 1943 |
| 2,333,588 | Schaevitz | Nov. 2, 1943 |
| 2,339,696 | Hawkinson | Jan. 18, 1944 |